US012759576B2

(12) United States Patent
Ashby et al.

(10) Patent No.: US 12,759,576 B2
(45) Date of Patent: Oct. 13, 2026

(54) METHOD FOR USING EXTEROCEPTIVE SENSOR DATA BASED ON VEHICLE STATE OR MISSION STATE

(71) Applicant: Autonomous Solutions, Inc., Mendon, UT (US)

(72) Inventors: Robert Ashby, Mendon, UT (US); Levi Baker, Mendon, UT (US); Taylor Bybee, Mendon, UT (US); Joshua Vanfleet, Mendon, UT (US); Jeff Ferrin, Mendon, UT (US)

(73) Assignee: Autonomous Solutions, Inc., Mendon, UT (US)

( * ) Notice: Subject to any disclaimer, the term of this patent is extended or adjusted under 35 U.S.C. 154(b) by 69 days.

(21) Appl. No.: 18/051,872

(22) Filed: Nov. 1, 2022

(65) Prior Publication Data

US 2023/0138671 A1 May 4, 2023

Related U.S. Application Data

(60) Provisional application No. 63/274,190, filed on Nov. 1, 2021.

(51) Int. Cl.

*B60W 60/00* (2020.01)
*B60W 10/06* (2006.01)
*B60W 10/18* (2012.01)

(52) U.S. Cl.

CPC .......... *B60W 60/001* (2020.02); *B60W 10/06* (2013.01); *B60W 10/18* (2013.01);
(Continued)

(58) Field of Classification Search

CPC .... B60W 60/001; B60W 10/06; B60W 10/18; B60W 2420/40; B60W 2420/403;
(Continued)

(56) References Cited

U.S. PATENT DOCUMENTS

2018/0272963 A1* 9/2018 Meyhofer ........... B60W 50/023
2020/0025575 A1* 1/2020 Weissman ............ G05D 1/0257
(Continued)

FOREIGN PATENT DOCUMENTS

CN 109343064 A * 2/2019 ............. G01S 15/93
DE 102019210339 A1 * 1/2021
(Continued)

OTHER PUBLICATIONS

Machine Translation of DE102019210339A1 (Year: 2021).*
(Continued)

*Primary Examiner* — Sahar Motazedi

(57) ABSTRACT

An autonomous vehicle may include a sensor array; an engine output control system; a braking control system; and a controller. The controller may be communicatively coupled with the sensor array, the engine output control system, and the braking control system. The controller may be configured to: sense an environment with the sensor array to produce sensor data; receiving autonomous vehicle state data; determining whether the autonomous vehicle state data is above a threshold state value; in the event the autonomous vehicle state data is above a threshold state value, not using the sensor data to operate the autonomous vehicle; and in the event the autonomous vehicle state data is not above a threshold state value, using the sensor data to operate the autonomous vehicle.

2 Claims, 4 Drawing Sheets

(52) U.S. Cl.
CPC ... *B60W 2420/40* (2013.01); *B60W 2420/403* (2013.01); *B60W 2420/408* (2024.01); *B60W 2420/50* (2013.01); *B60W 2420/54* (2013.01); *B60W 2520/10* (2013.01); *B60W 2555/20* (2020.02); *B60W 2556/40* (2020.02)

(58) Field of Classification Search
CPC ....... B60W 2420/408; B60W 2420/50; B60W 2420/54; B60W 2520/10; B60W 2555/20; B60W 2556/40; B60W 60/00; B60W 2050/0215; B60W 50/0205
See application file for complete search history.

(56) References Cited

U.S. PATENT DOCUMENTS

| | | | | |
|---|---|---|---|---|
| 2020/0201350 | A1* | 6/2020 | Newman | E01F 9/576 |
| 2020/0312052 | A1* | 10/2020 | Bonnevay | G07C 5/085 |
| 2021/0110217 | A1* | 4/2021 | Gunel | G06V 20/56 |
| 2021/0239808 | A1* | 8/2021 | Friend | G01S 17/42 |
| 2024/0272653 | A1* | 8/2024 | Zhao | G05D 1/857 |

FOREIGN PATENT DOCUMENTS

| | | | | | |
|---|---|---|---|---|---|
| JP | 2000023507 | A | * | 1/2000 | |
| WO | WO-2012072719 | A1 | * | 6/2012 | B60W 30/0953 |
| WO | WO-2018134152 | A1 | * | 7/2018 | |
| WO | WO-2020165055 | A1 | * | 8/2020 | A01C 23/008 |

OTHER PUBLICATIONS

Machine Translation of JP2000023507A (Year: 2000).*
Machine Translation of WO2012072719A1 (Year: 2012).*
Machine Translation of WO2018134152A1 (Year: 2018).*
Machine Translation of WO-2020165055-A1 (Year: 2020).*
Machine Translation of CN-109343064-A (Year: 2019).*

* cited by examiner

METHOD FOR USING EXTEROCEPTIVE SENSOR DATA BASED ON VEHICLE STATE OR MISSION STATE

BACKGROUND

Autonomous vehicles and semi-autonomous vehicles are becoming more widely used. These vehicles can include a number of sensors of different types that may be more or less useful for detecting obstacles depending on the state of the autonomous vehicle.

SUMMARY

An autonomous vehicle is disclosed. The autonomous vehicle may include a sensor array; an engine output control system; a braking control system; and a controller. The controller may be communicatively coupled with the sensor array, the engine output control system, and the braking control system. The controller may be configured to: sense an environment with the sensor array to produce sensor data; receiving autonomous vehicle state data; determining whether the autonomous vehicle state data is above a threshold state value; in the event the autonomous vehicle state data is above a threshold state value, not using the sensor data to operate the autonomous vehicle; and in the event the autonomous vehicle state data is not above a threshold state value, using the sensor data to operate the autonomous vehicle.

The various embodiments described in the summary and this document are provided not to limit or define the disclosure or the scope of the claims.

DETAILED DESCRIPTION

Methods and systems for filtering or removing sensor data based on the state of an autonomous vehicle are disclosed. Some sensor data, for example, may or may not be appropriate or useful during all operational states of an autonomous vehicle. For example, some sensor data may not be valuable during low speed operation of the autonomous vehicle. Others, for example, may not be useful during high speeds of the autonomous vehicle. And yet other sensor data is not useful during dusty or stormy conditions. In many conditions, such sensor data may result in false positive identification of obstacles. Various sensor data may be filtered, adjusted, or not used based on the state of the autonomous vehicle.

Radar data, for example, may be useful in determining obstacles while an autonomous vehicle is operating at high speeds (e.g., speeds greater than a threshold speed of 2 m/s). But because radar may provide low resolution data, it may present false positive identification of obstacles. Thus, radar data may be used at high speeds for obstacle detection. If an object is detected based on radar data, the autonomous vehicle may begin to slow down to avoid the obstacle. Once the autonomous vehicle's speed is below a threshold speed (e.g., below 2 m/s), lidar sensor data may be used to further identify and/or characterize the obstacle detected by the radar.

Figure 1:
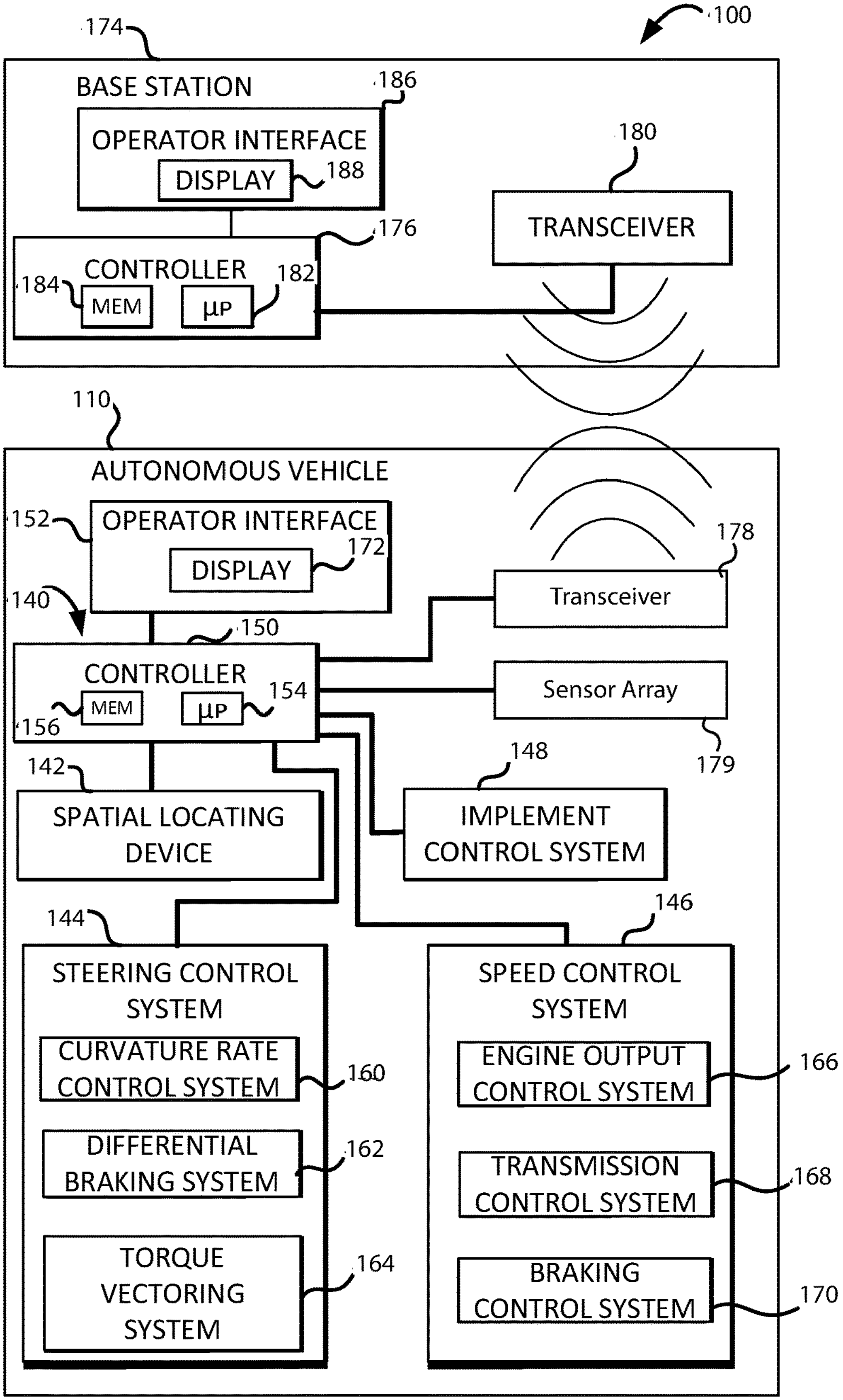
FIG. 1 is a block diagram of an example communication and control system for an autonomous vehicle.

FIG. 1 is a block diagram of an example communication and control system 100 for an autonomous vehicle. Portions of the communication and control system 100, for example, may include a vehicle control system which may be mounted on an autonomous vehicle 110. The autonomous vehicle 110, for example, may include an automobile, a truck, a van, an electric vehicle, a combustion vehicle, a loader, a wheel loader, a track loader, a dump truck, a digger, a backhoe, a forklift, a dump truck, a mower, a sprayer, etc. The communication and control system 100, for example, may include any or all components of computational system 400 shown in FIG. 4.

The autonomous vehicle 110, for example, may include a steering control system 144 that may control a direction of movement of the autonomous vehicle 110. The steering control system 144, for example, may include any or all components of computational system 400 shown in FIG. 4.

The autonomous vehicle 110, for example, may include a speed control system 146 that controls a speed of the autonomous vehicle 110. The autonomous vehicle 110, for example, may include an implement control system 148 that may control operation of an implement coupled with or towed by the autonomous vehicle 110 or integrated within the autonomous vehicle 110. The implement control system 148, for example, may include any type of implement such as, for example, a bucket, a shovel, a blade, a thumb, a dump bed, a plow, an auger, a trencher, a scraper, a broom, a hammer, a grapple, forks, boom, spears, a cutter, a wrist, a tiller, a rake, etc. The speed control system 146, for example, may include any or all components of computational system 400 shown in FIG. 4.

The control system 140, for example, may include a controller 150 communicatively coupled to the steering control system 144, to the speed control system 146, and the implement control system 148. The control system 140, for example, may be integrated into a single control system. The control system 140, for example, may include a plurality of distinct control systems. The control system 140, for example, may include any or all the components show in FIG. 4.

The controller 150, for example, may receive signals relative to many parameters of interest including, but not limited to: vehicle position, vehicle speed, vehicle heading, desired path location, off-path normal error, desired off-path normal error, heading error, vehicle state vector information, curvature state vector information, turning radius limits, steering angle, steering angle limits, steering rate limits, curvature, curvature rate, rate of curvature limits, roll, pitch, rotational rates, acceleration, and the like, or any combination thereof.

The controller 150, for example, may be an electronic controller with electrical circuitry configured to process data from the various components of the autonomous vehicle 110. The controller 150 may include a processor, such as the processor 154, and a memory device 156. The controller 150 may also include one or more storage devices and/or other suitable components (not shown). The processor 154 may be used to execute software, such as software for calculating drivable path plans. Moreover, the processor 154 may include multiple microprocessors, one or more "general-purpose" microprocessors, one or more special-purpose microprocessors, and/or one or more application specific integrated circuits (ASICS), or any combination thereof. For example, the processor 154 may include one or more reduced instruction set (RISC) processors. The controller 150, for example, may include any or all the components show in FIG. 4.

The controller 150 may be in communication with a spatial locating device 142 such as, for example, a GPS device. The spatial locating device 142 may provide geolocation data to the controller 150.

The memory device 156, for example, may include a volatile memory, such as random access memory (RAM), and/or a nonvolatile memory, such as ROM. The memory device 156 may store a variety of information and may be used for various purposes. For example, the memory device 156 may store processor-executable instructions (e.g., firmware or software) for the processor 154 to execute, such as instructions for calculating drivable path plan, and/or controlling the autonomous vehicle 110. The memory device 156 may include flash memory, one or more hard drives, or any other suitable optical, magnetic, or solid-state storage medium, or a combination thereof. The memory device 156 may store data such as field maps, maps of desired paths, vehicle characteristics, software or firmware instructions and/or any other suitable data.

The steering control system 144, for example, may include a curvature rate control system 160, a differential braking system 162, a steering mechanism, and a torque vectoring system 164 that may be used to steer the autonomous vehicle 110. The curvature rate control system 160, for example, may control a direction of an autonomous vehicle 110 by controlling a steering control system of the autonomous vehicle 110 with a curvature rate, such as an Ackerman style autonomous loader, 110 or articulating loader. The curvature rate control system 160, for example, may automatically rotate one or more wheels or tracks of the autonomous vehicle 110 via hydraulic or electric actuators to steer the autonomous vehicle 110. By way of example, the curvature rate control system 160 may rotate front wheels/tracks, rear wheels/tracks, and/or intermediate wheels/tracks of the autonomous vehicle 110 or articulate the frame of the loader, either individually or in groups. The differential braking system 162 may independently vary the braking force on each lateral side of the autonomous vehicle 110 to direct the autonomous vehicle 110. Similarly, the torque vectoring system 164 may differentially apply torque from the engine to the wheels and/or tracks on each lateral side of the autonomous vehicle 110. While the steering control system 144 includes the curvature rate control system 160, the differential braking system 162, and/or the torque vectoring system 164. A steering control system 144, for example, may include other and/or additional systems to facilitate turning the autonomous vehicle 110 such as an articulated steering control system, a differential drive system, and the like.

The speed control system 146, for example, may include an engine output control system 166, a transmission control system 168, and a braking control system 170. The engine output control system 166 may vary the output of the engine to control the speed of the autonomous vehicle 110. For example, the engine output control system 166 may vary a throttle setting of the engine, a fuel/air mixture of the engine, a timing of the engine, and/or other suitable engine parameters to control engine output. In addition, the transmission control system 168 may adjust gear selection within a transmission to control the speed of the autonomous vehicle 110. Furthermore, the braking control system 170 may adjust braking force to control the speed of the autonomous vehicle 110. While the illustrated speed control system 146 includes the engine output control system 166, the transmission control system 168, and/or the braking control system 170. A speed control system 146, for example, having other and/or additional systems to facilitate adjusting the speed of the autonomous vehicle 110 may be included.

Alternatively or additionally, the autonomous vehicle may comprise an electric vehicle with an electric motor and batteries. An electric vehicle may or may not include a transmission control system 168 and/or the engine output control system 166 may be coupled with the electric motor.

The implement control system 148, for example, may control various parameters of the implement towed by and/or integrated within the autonomous vehicle 110. For example, the implement control system 148 may instruct an implement controller via a communication link, such as a CAN bus, ISOBUS, Ethernet, wireless communications, and/or Broad R Reach type Automotive Ethernet, etc.

The implement control system 148, for example, may instruct an implement controller to adjust a penetration depth of at least one ground engaging tool of an agricultural implement, which may reduce the draft load on the autonomous vehicle 110.

The implement control system 148, as another example, may instruct the implement controller to transition an agricultural implement between a working position and a transport portion, to adjust a flow rate of product from the agricultural implement, to adjust a position of a header of the agricultural implement (e.g., a harvester, etc.), among other operations, etc.

The implement control system 148, as another example, may instruct the implement controller to adjust a shovel height, a shovel angle, a shovel position, etc.

The implement control system 148, as another example, may instruct the implement controller to adjust a shovel height, a shovel angle, a shovel position, etc.

The controller 150, for example, may be coupled with a sensor array 179. The sensor array 179, for example, may facilitate determination of condition(s) of the autonomous vehicle 110 and/or the work area. For example, the sensor array 179 may include one or more sensors (e.g., infrared sensors, ultrasonic sensor, magnetic sensors, radar sensors, Lidar sensors, terahertz sensors, sonar sensors, cameras, etc.) that monitor a rotation rate of a respective wheel or track and/or a ground speed of the autonomous vehicle 110. In a specific example, the sensor array may include two sensors: a lidar sensor and a radar sensor or lidar sensor and an ultrasonic sensor. The sensors may also monitor operating levels (e.g., temperature, fuel level, etc.) of the autonomous vehicle 110. Furthermore, the sensors may monitor conditions in and around the work area, such as temperature, weather, wind speed, humidity, and other conditions. The sensors, for example, may detect physical objects in the work area, such as the parking stall, the material stall, accessories, other vehicles, other obstacles, or other object(s) that may in the area surrounding the autonomous vehicle 110. Further, the sensor array 179 may be utilized by the first obstacle avoidance system, the second obstacle avoidance system, or both.

The operator interface 152, for example, may be communicatively coupled to the controller 150 and configured to present data from the autonomous vehicle 110 via a display 172. Display data may include data associated with operation of the autonomous vehicle 110, data associated with operation of an implement, a position of the autonomous vehicle 110, a speed of the autonomous vehicle 110, a desired path, a drivable path plan, a target position, a current position, etc. The operator interface 152 may enable an operator to control certain functions of the autonomous vehicle 110 such as starting and stopping the autonomous vehicle 110, inputting a desired path, etc. The operator interface 152, for example, may enable the operator to input parameters that cause the controller 150 to adjust the drivable path plan. For example, the operator may provide an input requesting that the desired path be acquired as quickly as possible, that an off-path normal error be minimized, that a speed of the autonomous vehicle 110 remain within certain limits, that a lateral acceleration experienced by the autonomous vehicle 110 remain within certain limits, etc. In addition, the operator interface 152 (e.g., via the display 172, or via an audio system (not shown), etc.) may alert an operator if the desired path cannot be achieved, for example.

The control system 140, for example, may include a base station 174 having a base station controller 176 located remotely from the autonomous vehicle 110. For example, control functions of the control system 140 may be distributed between the controller 150 of the control system 140 and the base station controller 176. The base station controller 176, for example, may perform a substantial portion of the control functions of the control system 140. For example, a first transceiver 178 positioned on the autonomous vehicle 110 may output signals indicative of vehicle characteristics (e.g., position, speed, heading, curvature rate, curvature rate limits, maximum turning rate, minimum turning radius, steering angle, roll, pitch, rotational rates, acceleration, etc.) to a second transceiver 180 at the base station 174. The base station controller 176, for example, may calculate drivable path plans and/or output control signals to control the curvature rate control system 160, the speed control system 146, and/or the implement control system 148 to direct the autonomous vehicle 110 toward the desired path, for example. The base station controller 176 may include a processor 182 and memory device 184 having similar features and/or capabilities as the processor 154 and the memory device 156 discussed previously. Likewise, the base station 174 may include an operator interface 186 having a display 188, which may have similar features and/or capabilities as the operator interface 152 and the display 172 discussed previously.

Figure 2:
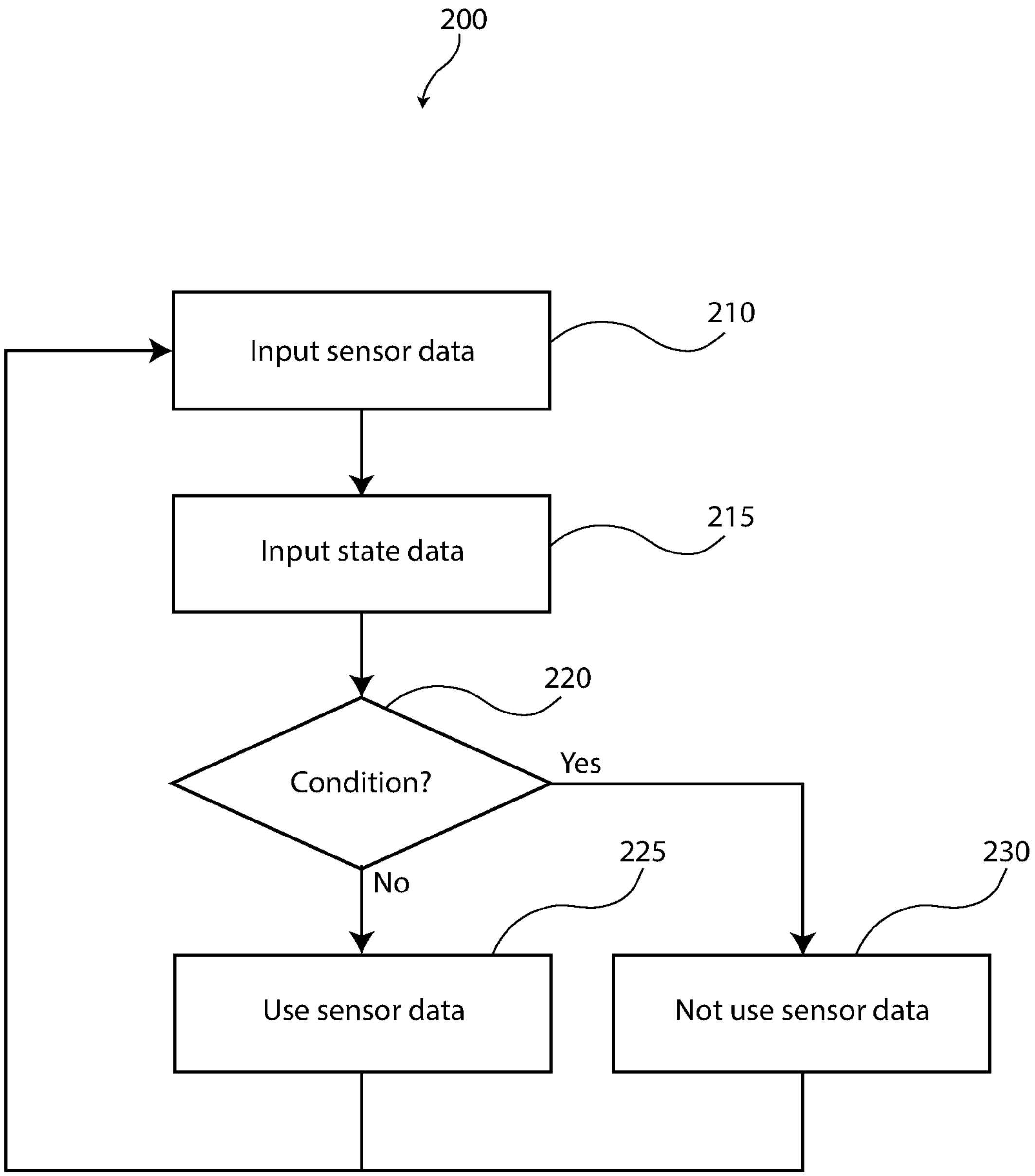
FIG. 2 is a flowchart of an example process for determining whether to use exteroceptive sensor data based on a vehicle state or mission state.

FIG. 2 is a flowchart of an example process 200 for determining whether to use exteroceptive sensor data based on a vehicle state or mission state. Process 200 may include any number of additional blocks between, before, or after the blocks shown in process 200. The blocks in process 200 may occur in any order. And any block in process 200 may be removed and/or replaced.

At block 210 sensor data may be received. The sensor data may include any sensor data from sensor array 179. The sensor data may include infrared sensor data, ultrasonic infrared sensor data, magnetic infrared sensor data, radar infrared sensor data, Lidar infrared sensor data, terahertz infrared sensor data, sonar infrared sensor data, and/or camera data, etc. The sensor data may be received at the control system 140.

At block 215 state data may be received. The state data may include autonomous vehicle speed data, autonomous vehicle velocity data, autonomous vehicle location data, autonomous vehicle direction data, map data, implement activity data, weather data, dust conditions, etc. The state data may include mission state data or autonomous vehicle state data. The sensor data may be received at the control system 140.

At block 220 the state data may be analyzed to determine whether a condition has been met. If the condition has been met, then process 200 proceeds to block 230 and the sensor data is not used. If the condition has not been met, then process 200 proceeds to block 235 and the sensor data is used. After block 225 or block 230 the process 200 returns to block 210. A pause for a period of time may be included between block 225 or block 230 and prior to block 210.

At block 225 the sensor data may be sent to the system such as, for example, to other processes or algorithms within the control system 140. At block 230 no sensor data may be sent, or a null value may be sent to the system such as, for example, to other processes or algorithms within the control system 140. For example, at block 225 the sensor data is used to operate the autonomous vehicle and at block 230 the sensor data is not used to operate the autonomous vehicle.

For example, the condition may be whether the autonomous vehicle speed is greater than, less than, or equal to a condition speed value. At block 220, the speed of the autonomous vehicle (the state data) may be analyzed to determine whether it is greater than, less than, or equal to the condition speed value. If it is, then process 200 may proceed to block 230 and specific sensor data may not be used at block 230.

As another example, at block 210 ultrasonic sensor data may be received at control system 140 from an ultrasonic sensor. At block 215 velocity data may be received. At block 220, the control system 140 may determine whether the velocity of the autonomous vehicle is less than a predetermined velocity value (e.g., 2.0, 1.5, 1, 0.5, etc. m/s) in the forward direction of the autonomous vehicle. If, for example, the velocity of the autonomous vehicle is less than the predetermined velocity value, then process 200 proceeds to block 230 and the ultrasonic sensor data is not used. If, for example, the velocity of the autonomous vehicle is greater than the predetermined velocity value, then process 200 proceeds to block 225 and the ultrasonic sensor data is used.

As another example, at block 210 lidar sensor data may be received at control system 140 from a LIDAR sensor. At block 215 speed data may be received. At block 220, the control system 140 may determine whether the speed of the autonomous vehicle is less than a predetermined speed value such as, for example, a predetermined speed value that may be dependent on the deceleration rate of the autonomous vehicle and/or the range of the LIDAR sensor (e.g., less than about 2 m/s, 1.5 m/s, 2 m/s, 0.5 m/s 0.25 m/s, etc. m/s). If, for example, the speed of the autonomous vehicle is less than the predetermined speed value, then process 200 proceeds to block 225 and the LIDAR sensor data is used. If, for example, the speed of the autonomous vehicle is greater than the predetermined speed value, then process 200 proceeds to block 230 and the LIDAR sensor data is not used.

As another example, at block 210 lidar sensor data (and/or other sensor data) may be received at control system 140 from an LIDAR sensor. At block 215 an implement state may be determined whether the implement is in a dusty state. A dusty state may include, for example, whether a bucket on an autonomous loader is being raised or has been raised, whether a bucket has been dumped, whether another vehicle has passed the autonomous vehicle or is about to pass the autonomous vehicle, or a plow or shovel on an autonomous plow is engaged, a shovel on an autonomous digger is engaged, etc. If the implement state is determined to be a dusty state at block 220, then process 200 proceeds to block 230 and lidar sensor data (and/or other sensor data) is not used.

As another example, at block 210 lidar sensor data (and/or other sensor data) may be received at control system 140 from an LIDAR sensor. At block 215 weather state data may be received. A weather state may include, for example, whether there is rain, snow, hail, fog, high wind, sunny weather, time of day, sun position, temperature, etc. If the weather state is determined to include rain, snow, hail, or high wind at block 220, then process 200 proceeds to block 230 and lidar sensor data (and/or other sensor data) is not used.

As another example, the condition may be whether the sensor data includes data from within a map area previously defined as being restricted. At block 220, the location of the sensor data (or portions of the sensor data) may be analyzed to determine whether it is within the map area. If it is, then process 200 may proceed to block 230 and the sensor data (or portions of the sensor data) may not be used at block 230.

Figure 3:
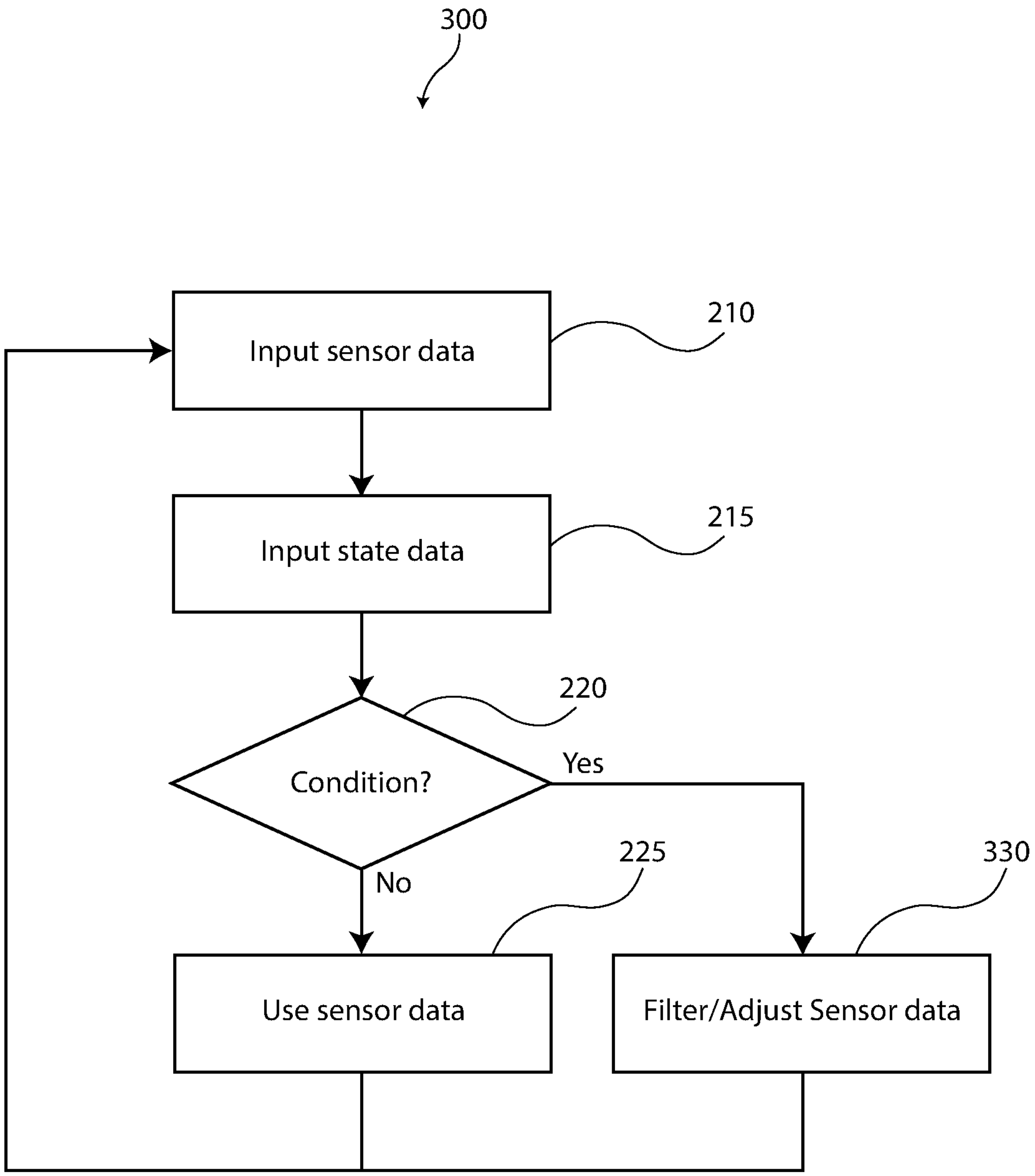
FIG. 3 is a flowchart of an example process for determining whether to use exteroceptive sensor data based on a vehicle state or mission state.

FIG. 3 is a flowchart of an example process 300 for determining whether to use exteroceptive sensor data based on a vehicle state or mission state. Process 300 may include any number of additional blocks between, before, or after the blocks shown in process 300. The blocks in process 300 may occur in any order. And any block in process 300 may be removed and/or replaced.

Process 300 includes blocks 210, 215, 229, and 225 from process 200. Block 230 from process 200, however, is replaced by block 330. At block 330, the sensor data may be filtered or adjusted. Filtered data may include any type of mathematical filter such as, for example, a geometry filter, classification filter, machine-learned classification filter, deep-learned classification filter, etc. An adjustment may include adjustments such as, for example, adjusting the contrast, adjusting the sensor sensitivity, adjusting the algorithm sensitivity, adjusting the magnitude, adjusting the weighing of sensor data, etc. As another example, an adjustment may include adjusting algorithm parameters based on the vehicle state or mission state.

For example, if the condition is based on a map area, the sensor data that falls within the map area may be filtered or removed from the sensor data. As another example, if the environmental state is dusty or there is precipitation the contrast on some sensor data may be increased. As another example, if the speed of the autonomous vehicle is above or below a specific value, then some sensor data may be filtered or adjusted.

Figure 4:
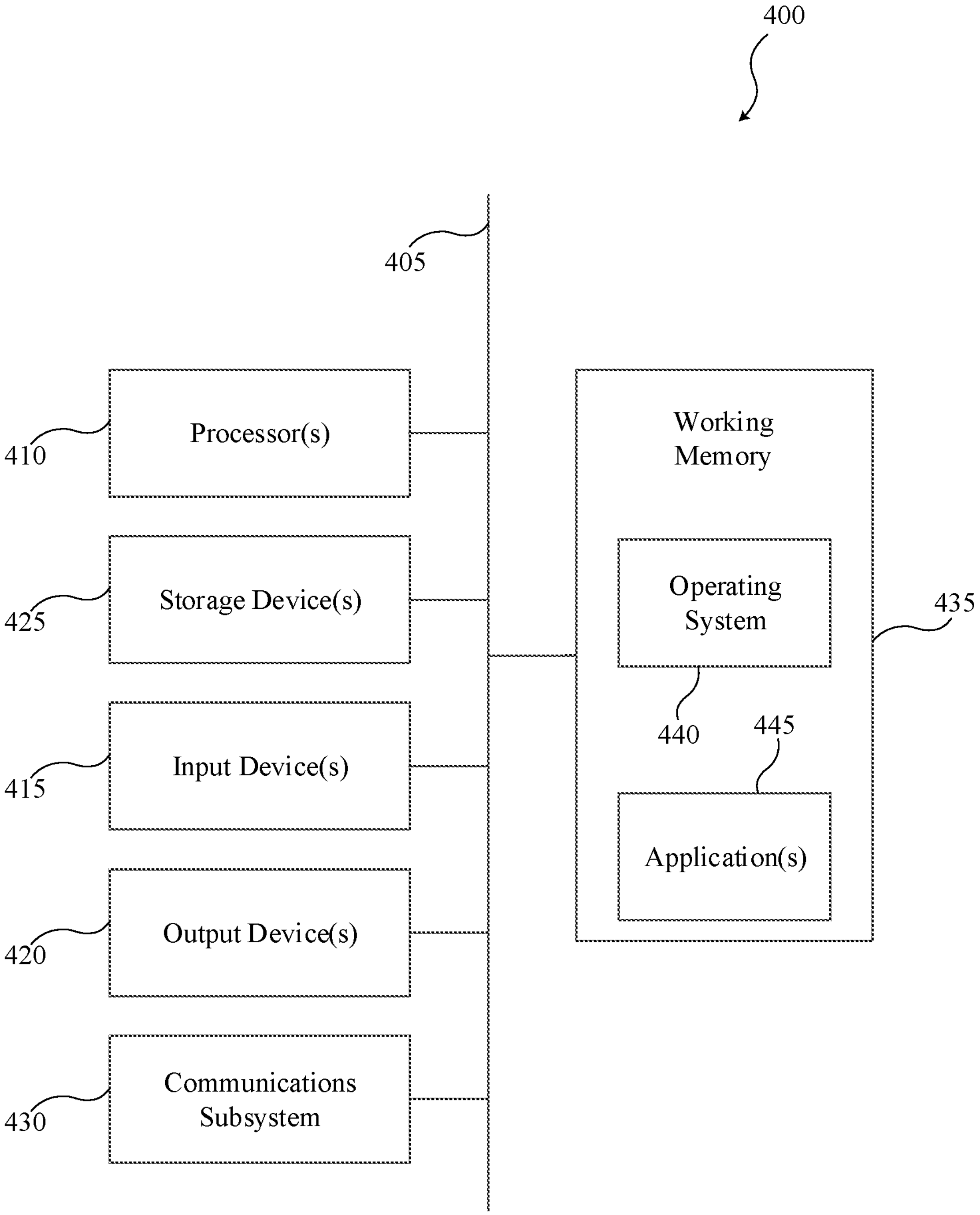
FIG. 4 is a block diagram of an example computational system that can be used to with or to perform some embodiments described in this document.

The computational system 400, shown in FIG. 4 can be used to perform any of the examples described in this document. For example, one or more computational systems 400 or components thereof can be used to execute process 200 and/or process 300. As another example, computational system 400 can perform any calculation, identification and/or determination described here. Computational system 400 includes hardware elements that can be electrically coupled via a bus 405 (or may otherwise be in communication, as appropriate). The hardware elements can include one or more processors 410, including without limitation one or more general-purpose processors and/or one or more special-purpose processors (such as digital signal processing chips, graphics acceleration chips, and/or the like); one or more input devices 415, which can include without limitation a mouse, a keyboard and/or the like; and one or more output devices 420, which can include without limitation a display device, a printer and/or the like.

The computational system 400 may further include (and/or be in communication with) one or more storage devices 425, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 400 might also include a communications subsystem 430, which can include without limitation a modem, a network card (wireless or wired), an infrared communication device, a wireless communication device and/or chipset (such as a Bluetooth device, an 802.6 device, a Wi-Fi device, a WiMax device, cellular communication facilities, etc.), and/or the like. The communications subsystem 430 may permit data to be exchanged with a network (such as the network described below, to name one example), and/or any other devices described in this document. In many embodiments, the computational system 400 will further include a working memory 435, which can include a RAM or ROM device, as described above.

The computational system 400 also can include software elements, shown as being currently located within the working memory 435, including an operating system 440 and/or other code, such as one or more application programs 445, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 425 described above.

In some cases, the storage medium might be incorporated within the computational system 400 or in communication with the computational system 400. In other embodiments, the storage medium might be separate from a computational system 400 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 400 and/or might take the form of source and/or installable code, which, upon compilation and/or installation on the computational system 400 (e.g., using any of a variety of generally available compilers, installation programs, compression/decompression utilities, etc.) then takes the form of executable code.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

The terms "first", "second", "third", etc. are used to distinguish respective elements and are not used to denote a particular order of those elements unless otherwise specified or order is explicitly described or required.

Numerous specific details are set forth to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained in software to be used in programming or configuring a computing device.

Embodiments of the methods disclosed may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. An autonomous vehicle comprising:

a Lidar sensor;

a radar sensor;

an engine output control system;

a braking control system; and a controller communicatively coupled with the Lidar sensor, the radar sensor, the engine output control system, and the braking control system, the controller configured to:

sense an environment with the Lidar sensor to produce Lidar sensor data;

receive implement state data for an implement coupled with or towed by the autonomous vehicle;

determine whether the implement state data indicates the implement is in a dusty state;

in the event the implement state data indicates the implement is in the dusty state, not use the Lidar sensor data to move the autonomous vehicle along a path; and in the event the implement state data indicates the implement is not in the dusty state, use the Lidar sensor data to move the autonomous vehicle along the path.

2. A method executing to control an autonomous vehicle, the method comprising:

sensing an environment with a Lidar sensor of the autonomous vehicle or attached to the autonomous vehicle to produce Lidar sensor data;

receiving implement state data for an implement coupled with or towed by the autonomous vehicle;

determining whether the implement state data indicates the implement is in a dusty state;

in the event the implement state data indicates the implement is in the dusty state, not using the Lidar sensor data to move the autonomous vehicle along a path; and in the event the implement state data indicates the implement is not in the dusty state, using the Lidar sensor data to move the autonomous vehicle along the path.

* * * * *